(12) United States Patent
Seack et al.

(10) Patent No.: US 9,523,168 B2
(45) Date of Patent: Dec. 20, 2016

(54) METHOD FOR PRODUCING A COMPONENT FOR JOINING STRUCTURES, COMPONENT AND STRUCTURAL ARRANGEMENT

(71) Applicants: Oliver Seack, Bremen (DE); Alexander Bruns, Bremen (DE)

(72) Inventors: Oliver Seack, Bremen (DE); Alexander Bruns, Bremen (DE)

(73) Assignee: Airbus Operations GmbH, Hamburg (DE)

( * ) Notice: Subject to any disclaimer, the term of this patent is extended or adjusted under 35 U.S.C. 154(b) by 487 days.

(21) Appl. No.: 13/649,213

(22) Filed: Oct. 11, 2012

(65) Prior Publication Data

US 2013/0092794 A1   Apr. 18, 2013

Related U.S. Application Data (60) Provisional application No. 61/546,761, filed on Oct. 13, 2011.

(30) Foreign Application Priority Data

Oct. 13, 2011   (DE) .......... 10 2011 084 441

(51) Int. Cl.
 *D06C 3/06* (2006.01)
 *B29B 11/16* (2006.01)
 (Continued)

(52) U.S. Cl.
 CPC .......... *D06C 3/06* (2013.01); *B29B 11/16* (2013.01); *B29C 70/222* (2013.01);
 (Continued)

(58) Field of Classification Search
 None
 See application file for complete search history.

(56) References Cited

U.S. PATENT DOCUMENTS

| 661,346 A | 11/1900 | Lincoln |
| 1,843,170 A | 2/1932 | Meldrim |

(Continued)

FOREIGN PATENT DOCUMENTS

| DE | 2757965 | 6/1979 |
| DE | 195 27 197 A1 | 1/1997 |

(Continued)

OTHER PUBLICATIONS

"pivot, v.". OED Online. Jun. 2015. Oxford University Press. http://www.oed.com/view/Entry/144827?rskey=v1Gu1Q&result=2 &isAdvanced=false (accessed Sep. 3, 2015).*

(Continued)

*Primary Examiner* — Jennifer Chriss
*Assistant Examiner* — Frank Vineis
(74) *Attorney, Agent, or Firm* — Jenkins, Wilson, Taylor & Hunt, P.A.

(57) ABSTRACT

The present invention provides a method for producing a component for joining structures at intersection regions thereof, comprising the following steps: forming a first fiber having a meandering shape which includes a plurality of first loops; forming a second fibre having a meandering shape which includes a plurality of second loops; and swivelling a first loop portion of a respective first loop and a first loop portion of a respective second loop such that a respective first loop and a respective second loop engage with one another.

8 Claims, 12 Drawing Sheets

(51) Int. Cl.
| | |
|---|---|
| *B29C 70/22* | (2006.01) |
| *B29D 99/00* | (2010.01) |
| *D04H 3/07* | (2012.01) |
| *B64C 1/00* | (2006.01) |
| *B64C 3/18* | (2006.01) |

(52) U.S. Cl.
CPC ............ *B29D 99/0003* (2013.01); *B64C 1/00* (2013.01); *B64C 3/187* (2013.01); *D04H 3/07* (2013.01); *Y02T 50/433* (2013.01)

(56) References Cited

U.S. PATENT DOCUMENTS

| | | | |
|---|---|---|---|
| 3,818,951 | A | 6/1974 | Greenwood |
| RE28,672 | E | 1/1976 | Wakeman |
| 4,122,871 | A | 10/1978 | McGinley |
| 4,201,815 | A | 5/1980 | Weiland et al. |
| 4,382,712 | A | 5/1983 | Buchs |
| 4,395,450 | A | 7/1983 | Whitener |
| 4,584,226 | A | 4/1986 | Vitale et al. |
| 4,622,254 | A | 11/1986 | Nishimura et al. |
| 4,671,470 | A | 6/1987 | Jonas |
| 4,686,134 | A | 8/1987 | Ono |
| 4,715,560 | A | 12/1987 | Loyek |
| 4,725,485 | A | 2/1988 | Hirokawa |
| 5,024,874 | A | 6/1991 | Yasui |
| 5,463,794 | A | 11/1995 | Erland |
| 5,945,053 | A | 8/1999 | Hettinga |
| 6,481,911 | B1 | 11/2002 | Streuber |
| 7,198,691 | B2 | 4/2007 | Ludin et al. |
| 7,425,103 | B2 | 9/2008 | Perez-Sanchez |
| 7,451,950 | B2 | 11/2008 | Perez-Sanchez |
| 7,521,108 | B2 | 4/2009 | Franklin et al. |
| 7,541,083 | B2 | 6/2009 | Grose et al. |
| 7,900,878 | B2 | 3/2011 | Perez-Sanchez |
| 8,220,744 | B2 | 7/2012 | Benthien |
| 8,322,656 | B2 | 12/2012 | Pahl |
| 8,328,134 | B2 | 12/2012 | Wagner |
| 8,642,151 | B2 | 2/2014 | Goering et al. |
| 8,833,697 | B2 | 9/2014 | Seack et al. |
| 8,967,541 | B2 | 3/2015 | Seack et al. |
| 2005/0175399 | A1 | 8/2005 | Perez-Sanchez |
| 2008/0173761 | A1 | 7/2008 | Benthien |
| 2009/0149100 | A1 | 6/2009 | Goering |
| 2010/0090062 | A1 | 4/2010 | Wagner |
| 2010/0148008 | A1 | 6/2010 | Hernando Sebastian et al. |
| 2011/0143085 | A1 | 6/2011 | Blot et al. |
| 2013/0091675 | A1 | 4/2013 | Seack |
| 2013/0094898 | A1 | 4/2013 | Seack |
| 2013/0099062 | A1 | 4/2013 | Seack |

FOREIGN PATENT DOCUMENTS

| | | |
|---|---|---|
| DE | 102006035576 | 12/2007 |
| DE | 10 2007011613 A1 | 7/2008 |
| DE | 10 2009024789 | 12/2010 |
| DE | 10 2011 084472 | 1/2013 |
| EP | 1 145 841 | 10/2001 |
| EP | 1 595787 | 11/2005 |
| EP | 1 627726 | 2/2006 |
| EP | 1627726 | 2/2006 |
| FR | 2 412 782 | 7/1979 |
| WO | WO 2009/064594 | 5/2009 |
| WO | WO 2011/035860 | 3/2011 |

OTHER PUBLICATIONS

"swivel, v.1". OED Online. Jun. 2015. Oxford University Press. http://www.oed.com/view/Entry/195996?rskey=Ntscj0&result=2 &isAdvanced=false (accessed Sep. 3, 2015).*
Ogale, A. Tailoring of Textile Preforms for Fibre-reinforced Polymer Composites, Journal of Industrial Textiles, Oct. 2004, vol. 34, No. 2, 77-96.*
Extended European Search Report for Application No. 12188065.2 dated Apr. 25, 2013.
Non-Final Office Action for U.S. Appl. No. 13/649,218 dated Apr. 17, 2014.
Notice of Allowance for U.S. Appl. No. 13/649,203 dated May 13, 2014.
Notice of Allowance for U.S. Appl. No. 13/649,203 dated Mar. 4, 2014.
Partial European Search Report for Application No. 12188066.0 dated Jan. 23, 2013.
European Search Report for Application No. 12188064.5 dated Feb. 13, 2013.
European Search Report for Application No. 12188066.0 dated Apr. 26, 2013.
Notice of Allowance for U.S. Appl. No. 13/649,218 dated Aug. 14, 2014.
European Search Report for Application No. 12188224 dated Mar. 20, 2014.
Notice of Allowance for U.S. Appl. No. 13/649,218 dated Oct. 29, 2014.
Corrected Notice of Allowance for U.S. Appl. No. 13/649,218 dated Nov. 17, 2014.
Restriction Requirement for U.S. Appl. No. 13/649,226 dated Dec. 31, 2014.
Non-Final Office Action for U.S. Appl. No. 13/649,226 dated Mar. 26, 2015.
European Office Action for Appliation No. 12 188 065.2 dated Apr. 23, 2015.
Final Office Action for U.S. Appl. No. 13/649,226 dated Sep. 23, 2015.
Non-Final Office Action for U.S. Appl. No. 13/649,226 dated Dec. 9, 2015.
Notice of Allowance for U.S. Appl. No. 13/649,226 dated May 10, 2016.
European Office Action for 12 188224.5 dated Mar. 4, 2016.

* cited by examiner

METHOD FOR PRODUCING A COMPONENT FOR JOINING STRUCTURES, COMPONENT AND STRUCTURAL ARRANGEMENT

CROSS-REFERENCE TO RELATED APPLICATIONS

This application claims the benefit of and priority to U.S. Provisional Application No. 61/546,761, filed on Oct. 13, 2011, and German patent application No. 10 2011 084 441.4, filed Oct. 13, 2011, the entire disclosures of which are incorporated herein by reference.

FIELD OF THE INVENTION

The present invention relates to a method for producing a component for joining structures, to a method for producing a structural arrangement, to a component and to a structural arrangement.

Figure 1:
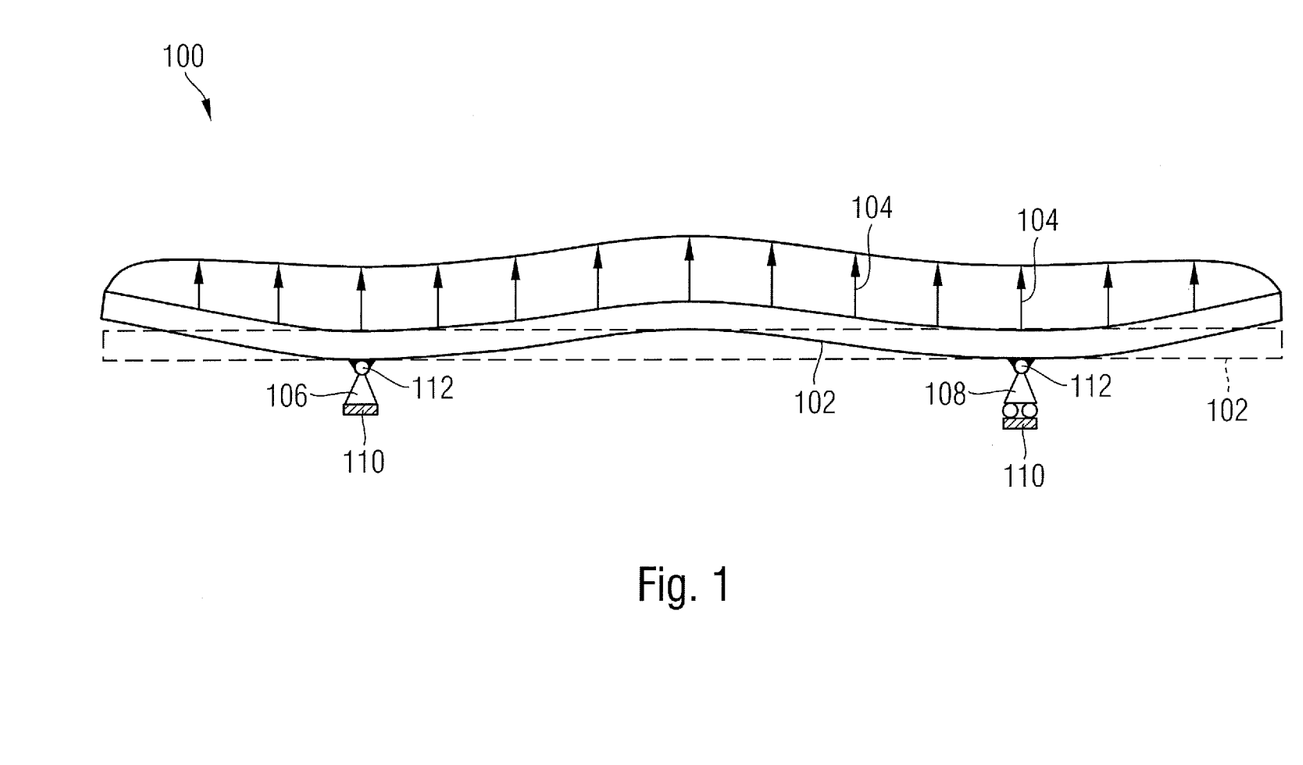
FIG. 1 shows a detail of an exemplary aircraft.

FIG. 1 shows a detail of an aircraft which is generally denoted by reference numeral 100. The aircraft 100 has a landing flap 102. FIG. 1 shows the landing flap 102, seen against the direction of flight of the aircraft 100. The landing flap 102 is illustrated once in dashed lines, which corresponds to its unloaded state. The landing flap 102 is also illustrated in solid lines, corresponding to its state deformed by air loads 104 and shown in a greatly exaggerated manner. The landing flap 102 is connected to a wing 110, which is merely shown schematically, by two flap carriages 106, 108. The flap carriages 106, 108 allow an adjustment of the landing flap 102 relative to the wing 110 from a flight position into a take-off or landing position, the take-off and landing positions serving to increase the lift. In the wingspan direction, i.e. in FIG. 1 from left to right, one flap carriage 106 is configured as a fixed bearing and the other flap carriage 108 is configured as a loose bearing. The flap carriages 106, 108 are each connected to the landing flap 102 by an eyebolt connection 112.

From the prior art, it is known to configure the eye of a respective eyebolt connection 112 as a fitting which is made of metal and is connected, in particular riveted, to the landing flap 102. For example, DE 10 2007 011 613 A1 discloses a metal fitting for the introduction of load.

There is an increasing demand for also producing load introduction elements, such as the eye, described above, of the eyebolt connection 112, from fibre composite materials, for example from carbon fibre-reinforced plastics materials (CFRP), to further reduce weight and to save assembly costs. US 2010/0148008 A1 describes a corresponding load introduction element made of fibre composite material which is produced in an RTM (resin transfer moulding) process.

SUMMARY OF THE INVENTION

An idea of the present invention is to provide a method for producing in a simple manner a component, in particular the load introduction element described above, a method for producing a structural arrangement in a simple manner, an improved component and an improved structural arrangement.

According thereto, a method for producing a component for joining structures at intersection regions thereof is provided, which comprises the following steps: arranging a first fibre with a meandering shape which includes a plurality of first loops; arranging a second fibre with a meandering shape which includes a plurality of second loops; and swivelling a first loop portion of a respective first loop and a first loop portion of a respective second loop such that a respective first loop and a respective second loop engage with one another.

A method for producing a structural arrangement is also provided in particular for an aircraft or spacecraft, which method comprises the steps: providing a first structure; providing a second structure which forms an intersection region with the first structure; producing a component according to the method of the invention; and joining the first and second structures in the intersection region by means of the component.

Furthermore, a component for joining structures at intersection regions thereof is provided having a first fibre with a meandering shape which includes a plurality of first loops, and having a second fibre with a meandering shape which includes a plurality of second loops, the first and second loops looping around one another in a coupling region for engagement with one another.

In addition, a structural arrangement is provided in particular for an aircraft or spacecraft, which arrangement comprises: a first structure and a second structure which form an intersection region with one another; and the component according to the invention which joins the first and second structures together in the intersection region.

In addition, a method for producing a component for joining structures at intersection regions thereof is provided, comprising the following steps: arranging at least a first and a second planar fibre semi-finished product one above another; joining the fibre semi-finished products together along a centre line thereof; and swivelling relative to one another portions of the first and second fibre semi-finished products about the centre line to form the component.

The idea addressed by the present invention is that it is possible to easily produce a component, in particular a load introduction element, by positioning and swivelling the first and second loops relative to one another such that they are coupled together positively. It is thereby possible to produce in particular a component having an approximately cross-shaped section, portions of the first and second loops being arranged approximately in a cruciform manner.

The use of the methods, the component and the structural arrangement is not restricted to the aerospace sector. For example, they can also be used in the production of bridges, multi-storey buildings, masts, roofs or other planar load-bearing structures.

The term "fibre" preferably means both an individual fibre and a bundle of individual fibres. "Fibre" can be a portion of a continuous fibre. It can also mean a fibre which is cut to length.

Advantageous configurations of the invention are set out in the subclaims.

A preferred configuration of the method according to the invention provides that the first loops are each in the form of an inverted U and the second loops are each U-shaped relative thereto. As a result, closed loop ends are produced which are directed in opposite directions and form in each case the first loop portions.

A preferred configuration of the method according to the invention provides that the first and second fibres have the same shape and are arranged offset relative to one another to produce the U-shaped and inverted U-shaped, relative thereto, first and second loops. As a result, the U shape and the inverted U shape can be produced in a simple manner.

A preferred configuration of the method according to the invention provides that the meandering shape of the first and/or second fibre is produced by rollers which are moved vertically to the initial longitudinal direction of the first and/or second fibre, furthermore one roller preferably being moved in one direction and the other roller in the opposite direction, alternating in the longitudinal direction. The meandering shape can be easily produced by the rollers.

A preferred configuration of the method according to the invention provides that the first loop portion of a respective first and second loop is closed at one end thereof and at the other end thereof adjoins an end of a second loop portion of a respective first and second loop, which portion is open at its other end, the first loop portions being preferably swivelled in each case into a second loop portion during the swivelling procedure. This produces in a simple manner the engagement between the first and second loops.

A preferred configuration of the method according to the invention provides that the first and second fibres extend in two mutually parallel planes before the first loop portions are swivelled. This measure provides a simple method. In the present context, "parallel" means that the planes form with one another an angle of less than 20 degrees, preferably less than 10 degrees and more preferably less than 5 degrees.

A preferred configuration of the method according to the invention provides that the first and second loop portions of the first and second loops are arranged in a cruciform manner after the swivelling procedure. In the present context, "in a cruciform manner" means that the loop portions are at an angle of 70 to 110 degrees, preferably from 80 to 100 degrees and more preferably from 87 to 93 degrees to one another.

A preferred configuration of the method according to the invention provides that for the swivelling procedure of the first loop portions, said first loop portions are caught and moved in each case by a hook. The loop portions can be easily caught by hooks.

A preferred configuration of the method according to the invention provides that the first and second fibres are joined together, in particular sewn or bonded together, before the first loop portions are swivelled, the first and second fibres preferably being joined together along a line which divides a respective first and second loop into the first and second loop portions. The measure of joining the fibres before the swivelling procedure ensures improved manageability of the components during and after the swivelling procedure.

According to a preferred configuration of the component according to the invention, the first loops are each in the form of an inverted U and the second loops are each U-shaped relative thereto.

According to a preferred configuration of the component according to the invention, first and second loop portions of the first and second loops are arranged in a cruciform manner.

BRIEF DESCRIPTION OF THE DRAWINGS

In the following, the invention will be described in more detail on the basis of embodiments with reference to the accompanying figures of the drawings.

In the figures, identical reference numerals and characters denote identical or functionally identical components, unless indicated otherwise.

DETAILED DESCRIPTION OF THE INVENTION

Figure 2:
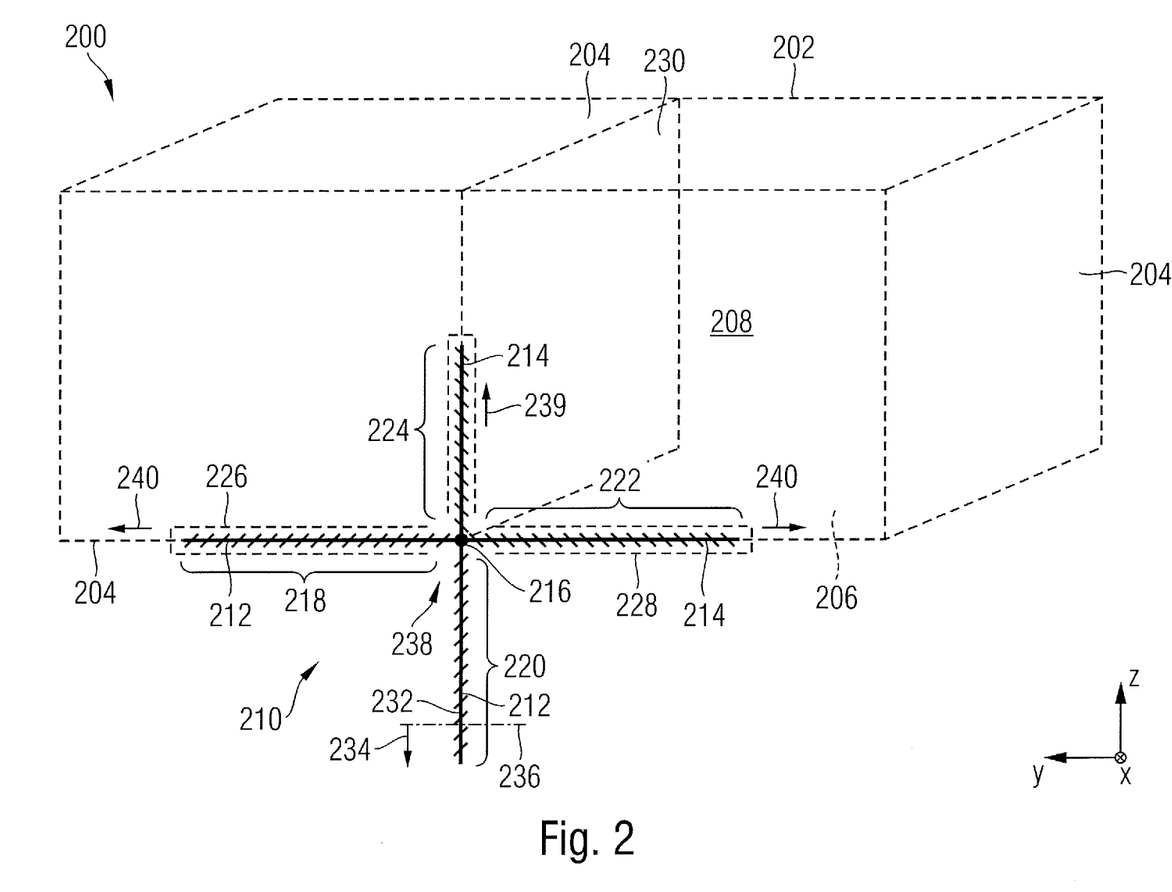
FIG. 2 is a schematic view of a structural arrangement comprising a component.

FIG. 2 is a partially perspective view of a structural arrangement 200 according to a relatively general embodiment.

The structural arrangement 200 is for example part of the landing flap 102 shown in FIG. 1 and is thus part of the aircraft 100. However, in principle, the structural arrangement 200 can be for example part of any flap or aerofoil.

In the present case, the three mutually orthogonal spatial directions are denoted by X, Y and Z. This merely serves to provide a clearer understanding of the spatial arrangement of the various components relative to one another. In the case of the landing flap 102, X denotes the direction of the oncoming flow, Y denotes the wingspan direction and Z denotes the vertical direction.

The structural arrangement 200 comprises a substantially closed box structure 202 indicated by dashed lines in FIG. 2. The description "substantially closed" means that the box structure 202 does not have any, or only relatively small, openings in its outer walls 204, 206. In FIG. 2, the front outer wall 206 is presented as being transparent to provide a view of the interior 208 of the box structure 202. According to one embodiment, the outer walls 204, 206 form the outer skin of the landing flap 102.

The structural arrangement 200 further comprises a component 210 composed of the first and second fibres 212, 214, only a single first fibre 212 of this type and only a single second fibre 214 of this type being shown for the sake of greater clarity. The component 210 can comprise any number of fibres 212 and 214 of this type. To provide a clearer distinction, the first and second fibres 212, 214 are identified by short lines in opposite directions.

A respective first fibre 212 and a respective second fibre 214 are joined together in a coupling region 216. The fibres 212, 214 loop around one another in the coupling region 216, as is described in more detail later on with reference to FIG. 3. Alternatively, a respective first fibre 212 is joined to a respective second fibre 214 by a sewing thread, as is described in more detail later on with reference to FIG. 4. Instead of using a sewing thread, there are also other possibilities of joining the first and second fibres 212, 214, such as braiding or bonding.

A respective first fibre 212 has a first portion 218 and a second portion 220. The first portion 218 extends for example in the horizontal XY plane, while the second portion 220 extends for example in the vertical XZ plane.

A respective second fibre 214 also has a first portion 222 and a second portion 224. The first portion 222 extends for example in the horizontal XY plane, while the second portion 224 extends for example in the vertical XZ plane.

A respective first fibre 212 and a respective second fibre 214 are thus each configured in the form of an angle and are arranged such that the portions 218, 220 are directed in respectively different directions. Overall, this produces a cruciform cross-sectional shape.

FIG. 2 also shows that the first portions 218, 222 of the first and second fibres 212, 214 are joined in each case with the lower outer wall 204 of the box structure 202, said wall extending in the XY plane. More precisely, preferably the first portion 218 of the first fibre 212 is integrated, particularly bonded, into a first portion 226 of the outer wall 204 and the second portion 222 of the second fibre 214 is integrated, particularly bonded, into a second portion 228 of the outer wall 204. For this purpose, the portions 226, 228 of the outer wall 204 can be forked in each case. However, it is also possible to attach the portions 218, 222 to or in the outer wall 204 of the box structure 202 in another way.

The second portion 220 of a respective first fibre 212 forms an outer web which extends downwards outside the box structure 202.

Furthermore, the second portion 224 of a respective second fibre 214 forms an inner web which projects upwards into the interior 208 of the box structure 202. The inner web 222 is joined to a supporting element 230 of the structural arrangement 200. The supporting element 230 is configured for example as a rib which is joined to the box structure 202. The supporting element 230 can also be configured for example as a spar or cross web. The inner web 224 is preferably integrated, in particular bonded, into the supporting element 230.

The outer web 220 has an attachment point 232 for introducing a first load 234 into the outer web 220. The attachment point 232 is configured in particular as an eye, but can also be configured as another structural load transfer means, such as a riveted joint or a bonded joint. A corresponding axis of the eye 232 is denoted by reference numeral 236.

The first fibre 212 introduces the first load 234, introduced at the attachment point 232, from the attachment point 232 into the first portion 226 of the outer wall 204 and, due to the coupling with the second fibre 214, into the supporting element 230 and into the second portion 228 of the outer wall 204. A corresponding reaction force, acting on the inner web 224, is denoted by reference numeral 239. However, due to the coupling between the first and second fibres 212, 214, a second load 240, for example a flexural load, can also be transferred simultaneously between the first and second portions 226, 228 of the box structure 202. The coupling of the first and second fibres 212, 214 thereby effectively prevents the eye 232 from peeling off in the coupling region 216 in spite of the fibre composite construction method.

The outer wall 204 forms with the supporting element 230 an intersection region 238 into which the component 210 is preferably bonded. The portions 218, 222 of the component 210 can be bonded into the outer wall 204 of the box structure 202 in different ways: the fully or partially cured portions 218, 222 can be cured with the wet outer wall 204. Furthermore, the fully or partially cured portions 218, 222 can be structurally bonded with the fully or partially cured outer wall 204. In addition, the dry portions 218, 222 can be jointly infiltrated and cured with the dry outer wall 204. The wet portions 218, 222 (prepreg) can also be bonded with the wet outer wall 204 (prepreg).

Furthermore, the inner web 224 of the component 210 is preferably also bonded into the supporting element 230 in one of the ways described above for the portions 218, 222. The outer web 220 can be bonded into a rib shown in FIG. 3.

Other options for joining the component 210 to the outer wall 204 and to the supporting element 230 are possible, for example by bolting or screwing.

Figure 3:
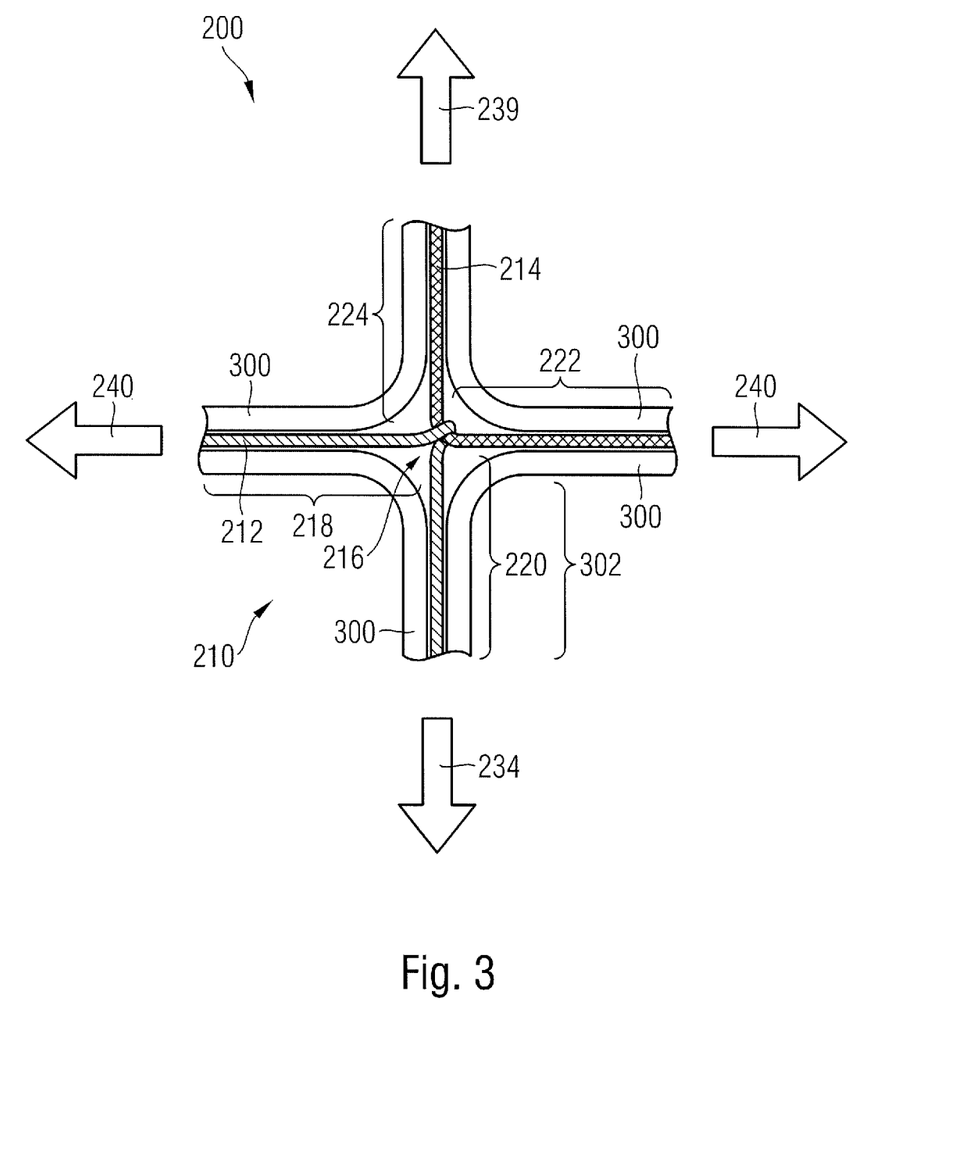
FIG. 3 shows a detail view from FIG. 2.

FIG. 3 shows a detail view from FIG. 2 according to one possible configuration.

FIG. 3 shows how the first and second fibres 212, 214 loop around one another in the coupling region 216. A method for producing a component 210 configured in this way will be described further below with respect to FIGS. 4 to 9.

Furthermore, FIG. 3 shows that it is possible to position on the component 210 fibre layers 300 which can form the portions 226, 228 of the outer wall 204 and form the supporting element 230 and preferably an outer rib 302. The outer web 220 is integrated into the rib 302.

In addition, the forces 234, 239 and 240 which act on the component 210 are again illustrated in FIG. 3.

FIGS. 4 to 9 are each perspective views of different states of a method for producing the component 210 according to FIG. 3. FIGS. 4, 6, 7, and 9 also show details of a device 400 for producing the component 210.

Figure 4:
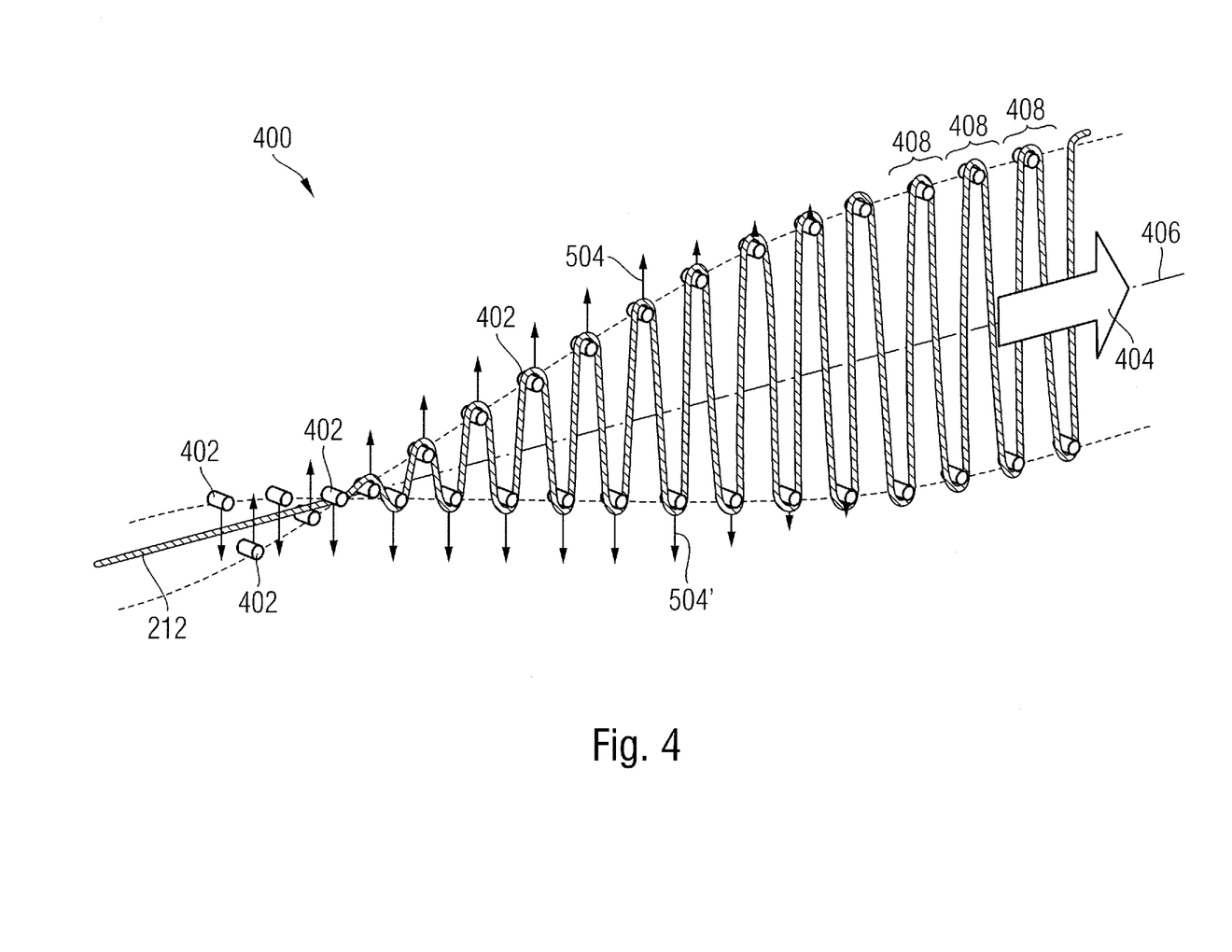
FIGS. 4-9 are each perspective views of different states of a first method.

The device 400 comprises rollers 402, see FIG. 4. A first fibre 212 which can still be part of a continuous fibre is moved through the device 400 in a conveying direction 404. Initially, the rollers 402 are located in a starting position above and below the continuous fibre 212 which extends along an axis 406. Subsequently, the rollers 402 arranged above the continuous fibre 212 are moved downwards and the rollers 402 arranged below the continuous fibre 212 are moved upwards, as indicated by the arrows 504, 504'. As a result, the first fibre 212 receives a meandering shape with a plurality of inverted U-shaped first loops 408 in the region of the rollers 402.

Figure 5:
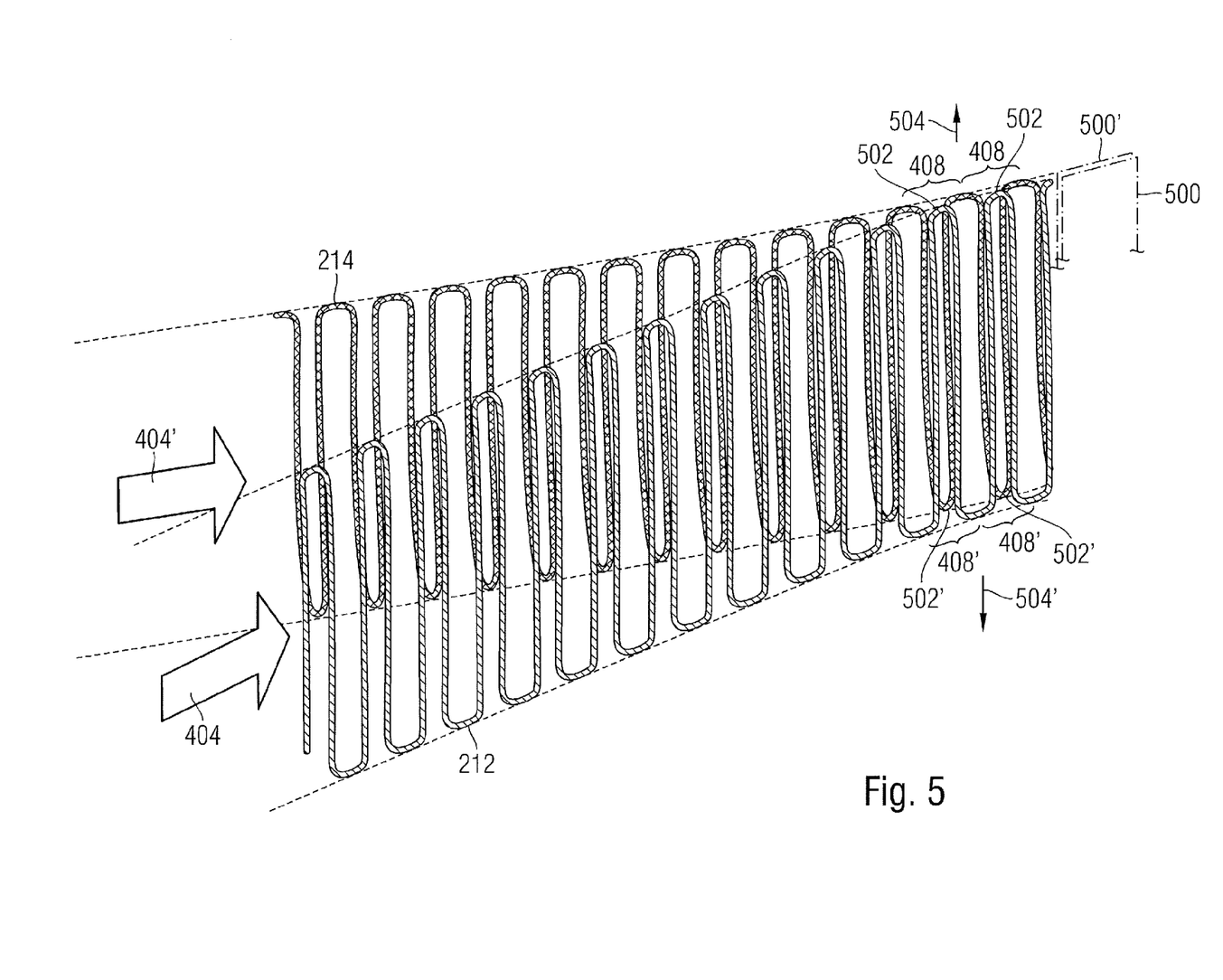

In parallel therewith, beforehand or afterwards a second fibre 214 is also produced with a meandering shape which includes a plurality of U-shaped second loops 408' by appropriate rollers 402, see FIG. 5.

As shown in FIG. 5, the loops 408 of the first fibre 212 are characterised in that they each have a closed end 502 which is directed in a first direction 504 (in FIG. 5 indicated by an upwardly pointing arrow). On the other hand, the loops 408' of the second fibre 214 are such that they each have a closed end 502' which is directed in a second direction 504' (in FIG. 5 indicated by a downwardly pointing arrow) which is opposite the first direction 504.

As shown in FIG. 5, in a further step the fibres 212, 214 are arranged immediately adjacently to one another in parallel planes 500, 500'. This can be carried out in a simple manner by appropriately adjusting the respective conveying directions 404, 404'. Furthermore, the first and second fibres 212, 214 are positioned relative to one another such that the loops 408 of the first fibre 212 and the loops 408' of the second fibre 214 are in each case directly opposite one another vertically to the planes 500, 500'. For this purpose, the first and second fibres 212, 214 are preferably initially produced with the same initial shape and are then arranged offset to one another.

Figure 6:
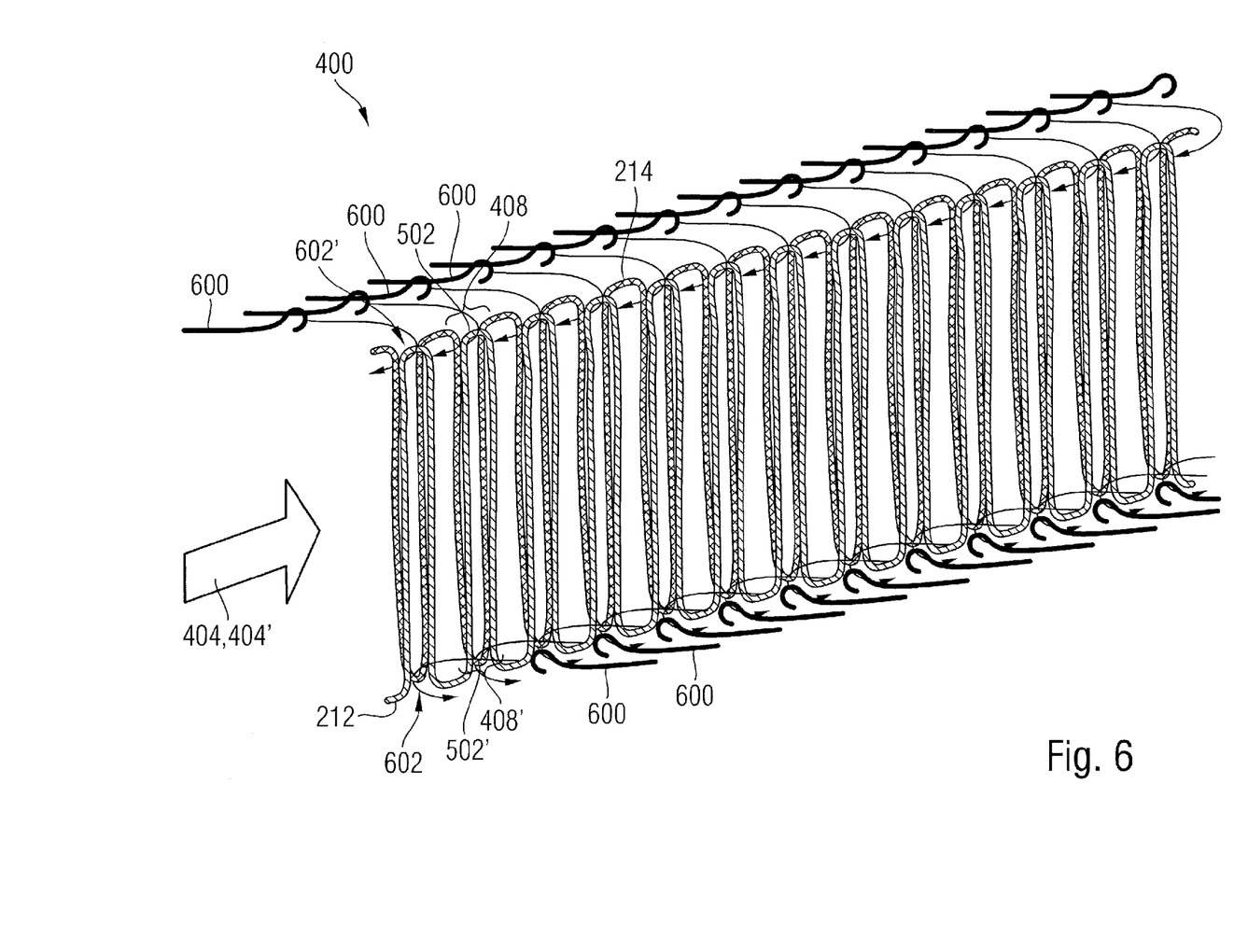

The first and second fibres 212, 214 are then brought into a region of the device 400 equipped with hooks 600, 600', as shown in FIG. 6.

A respective first hook 600 catches in a first portion 218 (see FIG. 7) of the first loop 408, which portion comprises the closed end 502, and swivels it by preferably 90 degrees with respect to a second portion 220 of the first loop 408, which portion comprises an open end 602 of the first loop 408. The second loop portion 220 is held such that it is stationary in a manner which is not shown, for example also by means of hooks.

Figure 7:
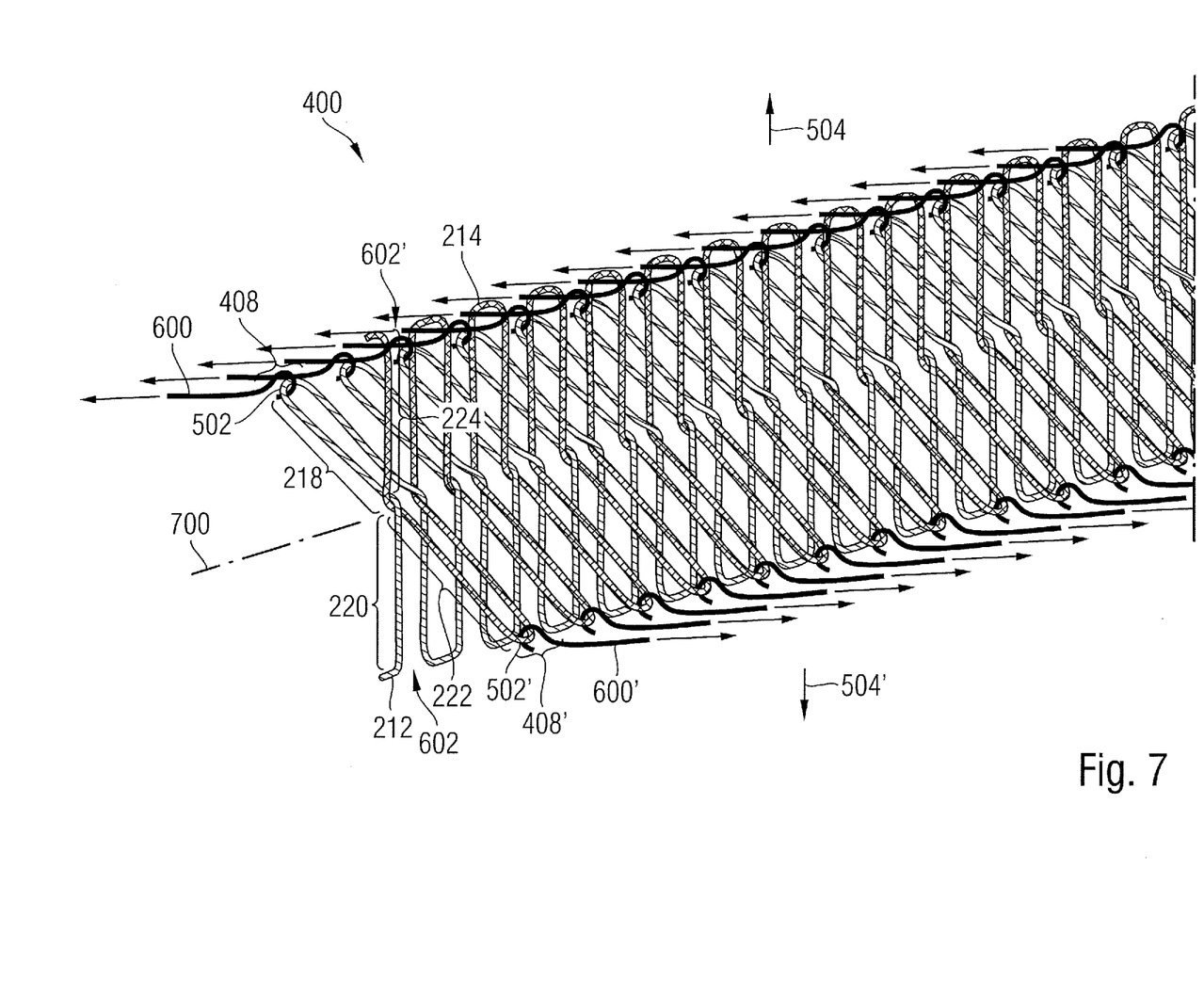

A respective second hook 600' catches a first portion 222 of the second loop 408', which portion comprises the closed end 502', and also swivels it by preferably 90 degrees with respect to a second portion 224 of the second loop 408', which portion comprises an open end 602' of the second loop 408', see FIG. 7. The second loop portion 224 is held such that it is stationary in a manner which is not shown, for example also by means of hooks. The first loop portions 218, 222 are swivelled in the same direction, for example as shown in a counter-clockwise direction.

During the swivelling procedure, the first loop portion 218, closed at its end 502, of the first fibre 212 is swivelled through the second loop portion 224, open at its end 602', of the second fibre 214 and the first portion 222, closed at its end 502', of the second fibre 214 is swivelled through the second loop portion 220, open at its end 602, of the first fibre 212.

As a result, a respective first loop 408 and a respective second loop 408' engage with one another positively by looping around one another. This engagement preferably takes place along a centre line 700 which is arranged centrally in respect of a total extent of the loops 408, 408' in the first and second directions 504, 504'.

Figure 8:
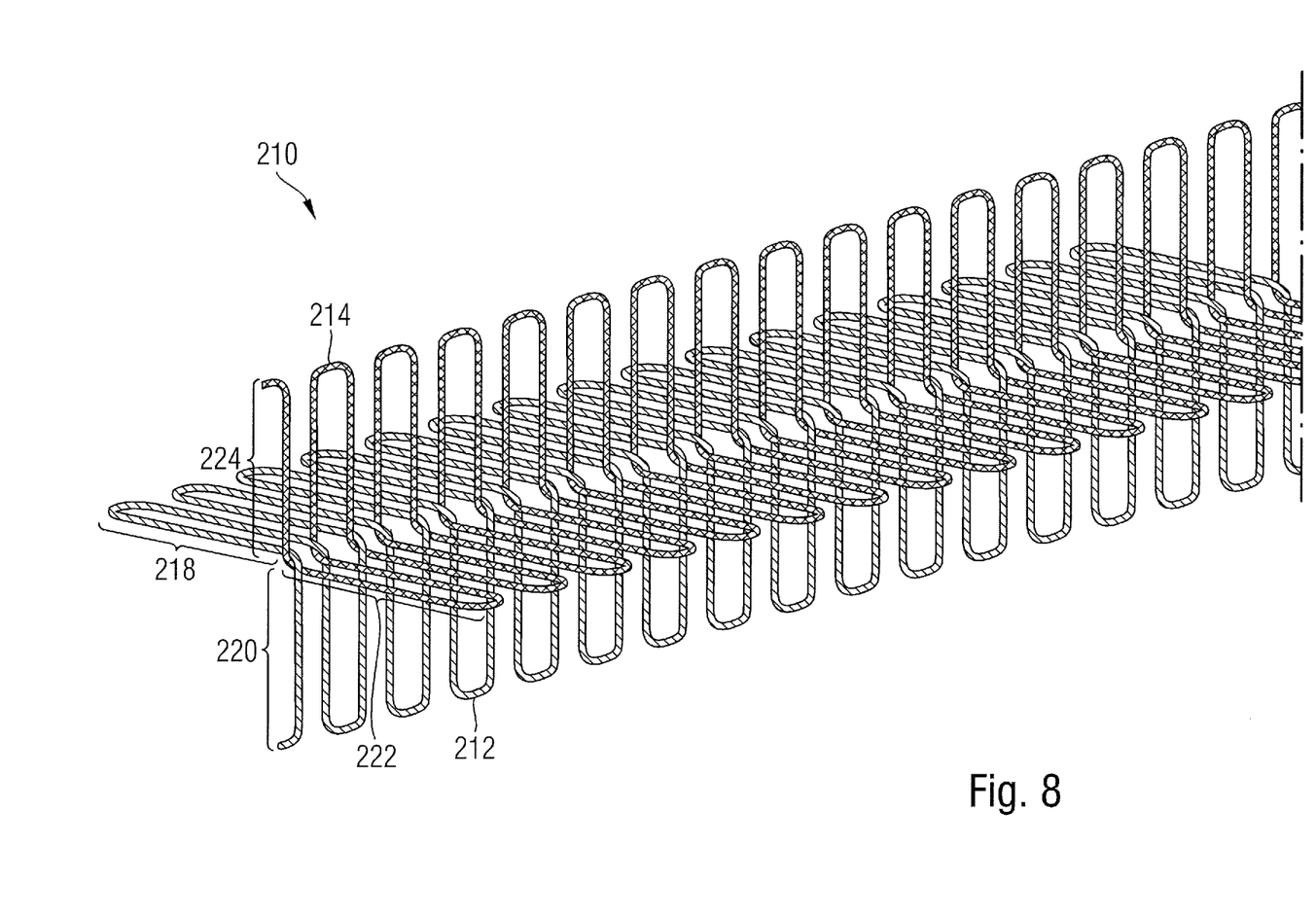

The component 210 illustrated in FIG. 8 is thus produced having a cross-shaped section, which component is thereafter integrated into the intersection region 238, see FIG. 2.

Figure 9:
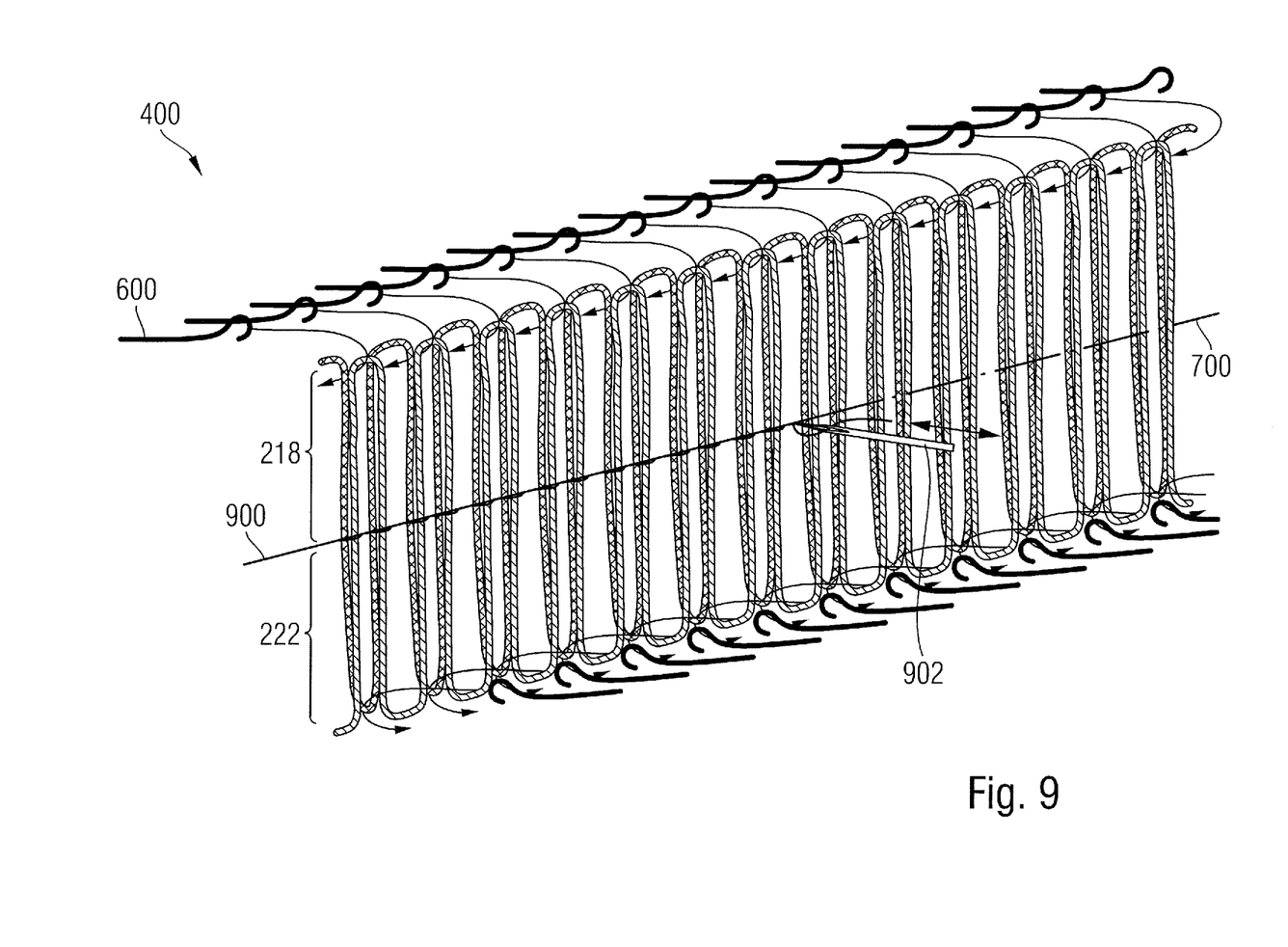

As shown in FIG. 9, the first and second loops 408, 408' can be sewn with sewing threads 900, particularly along the centre line 700, before the first loop portions 218, 222 are swivelled. For this purpose, the device 400 has at least one sewing needle 902.

Instead of being sewn together, the first and second loops 408, 408' could also be bonded together, in particular by a thermoplastic thread or by adhesive tape.

Figure 10:
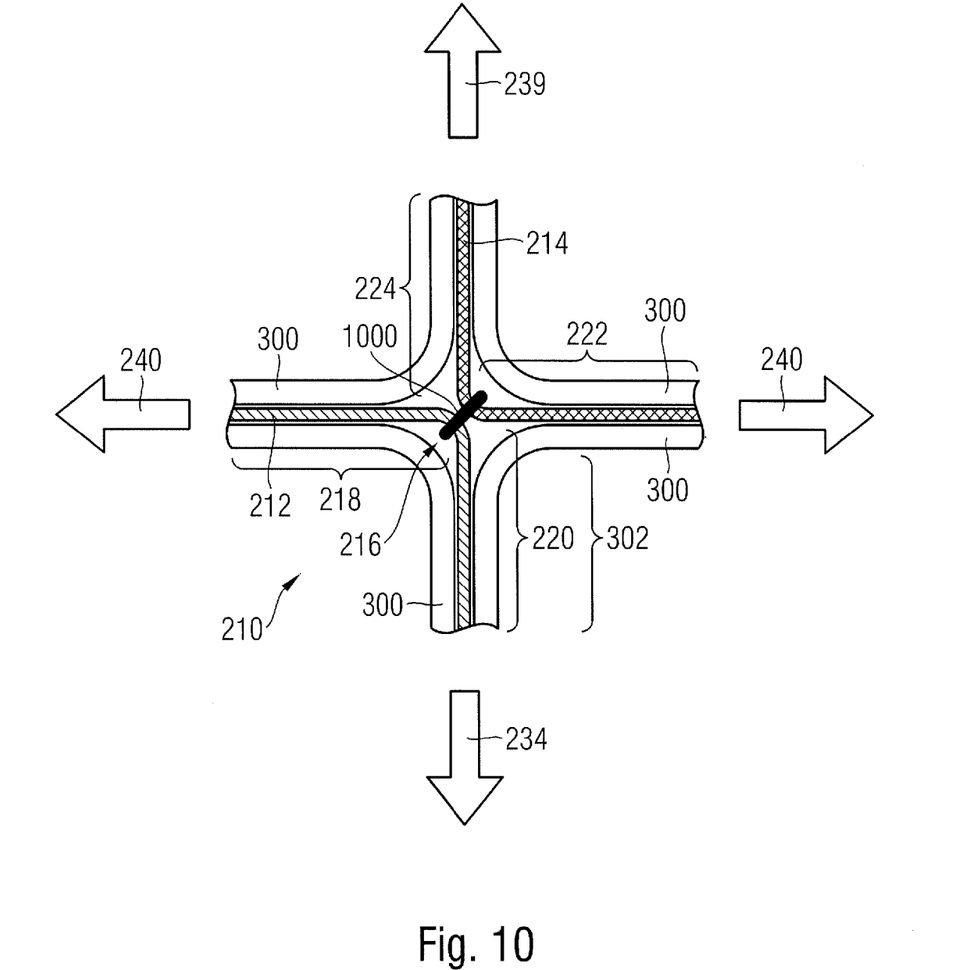
FIG. 10 shows the detail view from FIG. 3 according to a variation.

FIG. 10 shows the detail view from FIG. 3 according to a variation.

Unlike FIG. 3, the first and second fibres 212, 214 do not loop around one another in the coupling region 216, but are joined together by a sewing thread 1000. However, other joining methods are also possible here. One method for producing a component 210 configured in this manner will be described below with reference to FIGS. 11 to 15.

Figure 11:
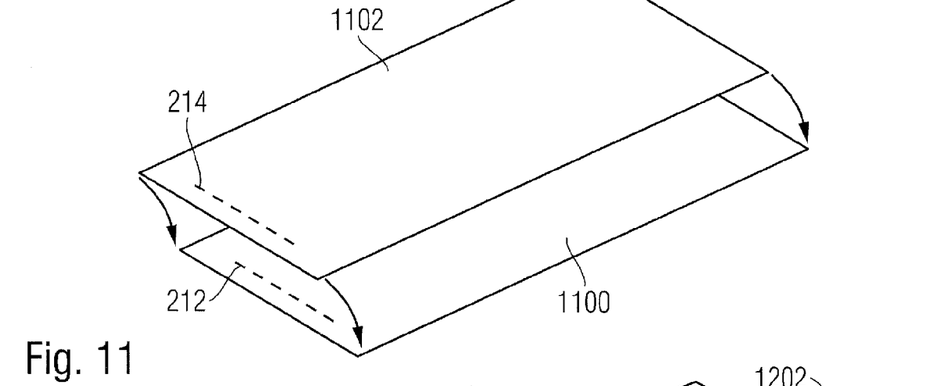
FIGS. 11-15 are each perspective views of different states of a second method.
Figure 12:
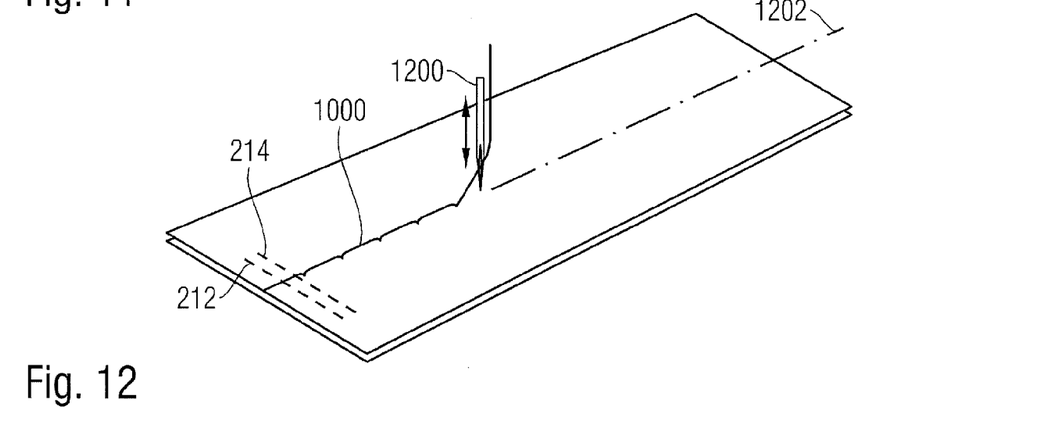

First of all, two planar fibre semi-finished products 1100, 1102 are arranged one above the other in a substantially planar parallel manner (see FIGS. 11 and 12). The fibre semi-finished products are for example woven fabric or non-woven fabric. The fibre semi-finished product 1100 comprises the first fibres 212, while the second semi-finished product 1102 comprises the second fibres 214, as indicated in FIGS. 11 and 12.

Figure 13:
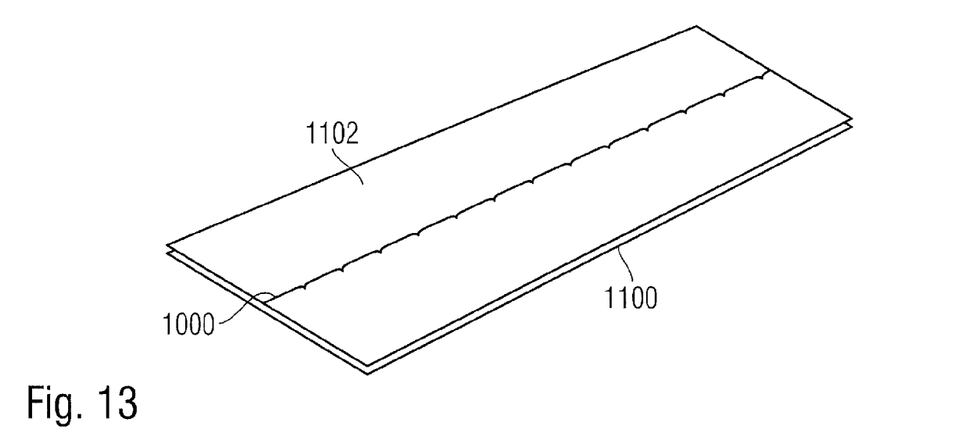

Thereafter, as shown in FIG. 12, the fibre semi-finished products 1100, 1102 are sewn together along a centre line 1202 of the fibre semi-finished products 1100, 1102 by a sewing thread 1000 using an appropriate sewing machine, indicated by a sewing needle 1200. The fibre semi-finished products 1100, 1102 which have been sewn together are shown in FIG. 13.

Figure 14:
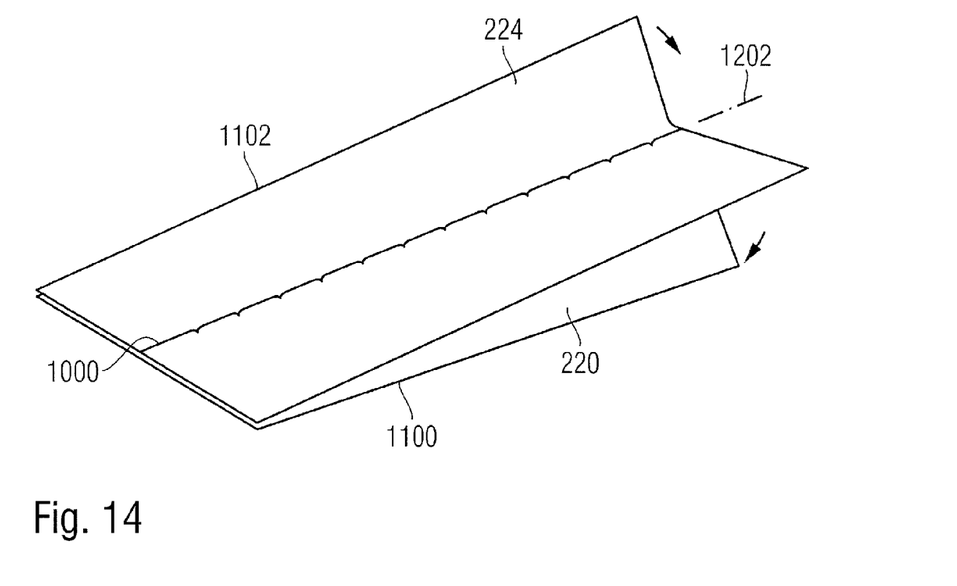
Figure 15:
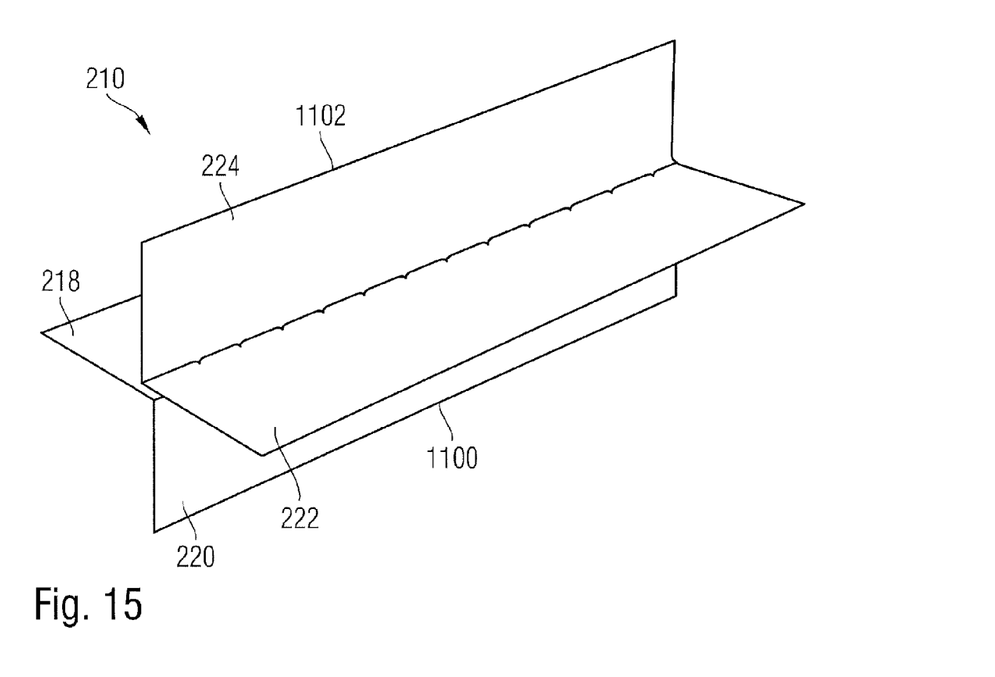

In a further step shown in FIGS. 14 and 15, a portion 220 of one fibre semi-finished product 1100 is swivelled downwards and a portion 224 of the other fibre semi-finished product 1102 is swivelled upwards about the centre axis 1202, i.e. about the resulting seam, thereby producing a component 210 having a cross-shaped section, as shown in FIGS. 10 and 15.

Thereafter, the component 210 which has been formed can be integrated into the intersection region 238, see FIG. 2.

Although the invention has been described above on the basis of preferred embodiments, it is by no means restricted thereto, but can be modified in many different ways. In particular, the embodiments and configurations, described for the methods according to the invention, can be applied accordingly to the device according to the invention, to the component according to the invention and to the structural arrangement according to the invention, and vice versa. Furthermore, "a" in the present context does not exclude a plurality.

In the following, exemplary embodiments of the device will be described:

1. Device for producing a component for joining structures at intersection regions thereof, in particular for implementing a method comprising the following steps: arranging a first fibre having a meandering shape which includes a plurality of first loops; arranging a second fibre with a meandering shape which includes a plurality of second loops; and swivelling a first loop portion of a respective first loop and a first loop portion of a respective second loop such that a respective first loop and a respective second loop engage with one another, comprising: a first means for forming a first fibre having a meandering shape which includes a plurality of first loops; a second means for forming a second fibre having a meandering shape which includes a plurality of second loops; and a swivel means for swivelling a first loop portion of a respective first loop and a first loop portion of a respective second loop such that a respective first loop and a respective second loop engage with one another.

2. Device according to embodiment 1, the first and/or second means comprising a plurality of rollers which can be moved vertically to the initial longitudinal direction of the first and/or second fibre, it being preferably provided that one roller can be moved in one direction and the other roller can be moved in the opposite direction, alternating in the longitudinal direction.

3. Device according to embodiment 1 or 2, wherein the swivel means is configured to swivel the first and second portions of the first and second loops relative to one another such that they are arranged in a cruciform manner after being swivelled.

4. Device according to any one of embodiments 1 to 3, wherein the swivel means comprises hooks for catching and swivelling a respective first loop portion.

What is claimed is:

1. A component for joining structures at intersection regions thereof, comprising:
   a first fibre having a meandering shape which includes a plurality of first loops, and a second fibre having a meandering shape which includes a plurality of second loops,
   wherein the first and second loops loop around one another to engage with one another in a coupling region,
   wherein a respective first loop and a respective second loop each comprise a first loop portion and a second loop portion,
   wherein the first loop portion of the respective first and second loops is closed at one end thereof and at the other end thereof adjoins an end of the second loop portion of the respective first and second loops, which portion is open at the other end thereof,
   wherein engagement of the respective first loop and the respective second loop with one another is brought about by swivelling the first loop portion of the respective first loop with respect to the second loop portion of the respective first loop and by swivelling the first loop portion of the respective second loop with respect to the second loop portion of the respective second loop,
   wherein before the first loop portions are swivelled, the first and second fibres are joined together along a line which divides the respective first and second loops into the first and second loop portions, wherein in order to accomplish the joining of the first and second fibres along the line which divides the respective first and second loops into the first and second loop portions, the first and second fibres are sewn together before the first loop portions are swivelled, wherein the engagement of the respective first and second loops takes place along the line which divides the respective first and second loops into the first and second loop portions, and wherein the first loop portion of the respective first loop is inclined with respect to the second loop portion of the respective first loop by a predetermined angle, and the first loop portion of the respective second loop is inclined with respect to the second loop portion of the respective second loop by a predetermined angle.

2. The component according to claim 1, wherein the first loops are each in the form of an inverted U and the second loops are each U-shaped relative thereto.

3. The component according to claim 1, wherein the first and second loop portions of the first and second loops are arranged in a cruciform manner.

4. A structural arrangement, in particular for an aircraft or spacecraft, comprising:

a first and a second structure which form with one another an intersection region; and a component according to claim 1 which joins together the first and second structures in the intersection region.

5. The component according to claim 2, wherein the first and second fibres have the same shape and are arranged offset relative to one another to produce the inverted U-shaped first loops and the second loops which are U-shaped relative thereto.

6. The component according to claim 5, wherein the first and second fibres are arranged offset relative to one another along the line which divides the respective first and second loops into the first and second loop portions.

7. The component according to claim 1, wherein the first and second fibres extend in two mutually parallel planes before the first loop portions are swivelled, the first and second fibres being positioned relative to one another such that the first loops and the second loops are in each case directly opposite one another vertically to the planes.

8. The component according to claim 1, wherein during the swivelling procedure the first loop portions are swivelled in each case into the second loop portion.

\* \* \* \* \*